(12) United States Patent
Talon et al.

(10) Patent No.: US 9,907,429 B2
(45) Date of Patent: Mar. 6, 2018

(54) BEVERAGE PREPARATION MACHINE WITH CLEANABLE BREWING HEAD

(71) Applicant: NESTEC S.A., Vevey (CH)

(72) Inventors: Christian Talon, Vufflens-le-Chateau (CH); Alfred Yoakim, St-legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 674 days.

(21) Appl. No.: 14/385,195

(22) PCT Filed: Mar. 18, 2013

(86) PCT No.: PCT/EP2013/055499
§ 371 (c)(1),
(2) Date: Sep. 15, 2014

(87) PCT Pub. No.: WO2013/135901
PCT Pub. Date: Sep. 19, 2013

(65) Prior Publication Data
US 2015/0034127 A1    Feb. 5, 2015

(30) Foreign Application Priority Data
Mar. 16, 2012  (EP) .................... 12159788

(51) Int. Cl.
*A47J 31/40*    (2006.01)
*A47J 31/60*    (2006.01)
(Continued)

(52) U.S. Cl.
CPC .......... *A47J 31/407* (2013.01); *A47J 31/3695* (2013.01); *A47J 31/46* (2013.01); *A47J 31/60* (2013.01); *B08B 3/048* (2013.01)

(58) Field of Classification Search
CPC .................................................. B08B 3/048
See application file for complete search history.

(56) References Cited

U.S. PATENT DOCUMENTS 6,904,840 B1    6/2005   Pfeifer et al.
2007/0272084 A1  11/2007  Mandralis et al.
(Continued)

FOREIGN PATENT DOCUMENTS

EP    2071988    6/2009

OTHER PUBLICATIONS

International Search Report for International Application No. PCT/EP2013/055499 dated Apr. 22, 2013.
(Continued)

*Primary Examiner* — Mikhail Kornakov
*Assistant Examiner* — Natasha N Campbell
(74) *Attorney, Agent, or Firm* — K&L Gates LLP

(57) ABSTRACT

The present invention concerns a beverage preparation machine (1) for preparing a beverage from a food substance contained in a capsule (12) by injection of a fluid into said capsule (12), said machine comprising: —a capsule holder (8) for holding a capsule, said holder (8) having a cup-shaped body (27), a handle portion (28), and a dispensing opening (29) through the bottom portion (30) of said body (27); —a fluid conduction system comprising a fluid reservoir (2), a fluid pump, optionally a fluid heater, said reservoir, pump and heater being connected by fluid pipes; —a brewing head (3) having an aperture for receiving said capsule holder (8), and an injection support (17) connected to the fluid conduction system; —an injection plate (18) supported by said support (17), said injection plate (18) comprising an upper surface (23) with a fluid coupling (32) connected to the fluid conduction system through said support, said injection plate (18) further comprising a fluid conducting channel (24) connecting the fluid coupling (32) to a fluid injection element (19) located in the lower surface (22) of said injection plate (18), such that said injection element (19) is able to inject fluid into the capsule (12),
(Continued)

characterized in that said injection plate (18) further comprises at least one cleaning channel (21) independent from the fluid conducting channel (24) connecting its upper (23) and lower (22) surfaces, said cleaning channel(s) (21) being suitable for circulating fluid at least from the lower surface (22) towards the upper surface (23) of said injection plate (18).

13 Claims, 10 Drawing Sheets

(51) Int. Cl.
*A47J 31/46* (2006.01)
*B08B 3/08* (2006.01)
*B08B 3/04* (2006.01)
*A47J 31/36* (2006.01)

(56) References Cited

U.S. PATENT DOCUMENTS

| | | | |
|---|---|---|---|
| 2009/0175986 A1* | 7/2009 | Doglioni Majer | B65D 85/8043 426/77 |
| 2010/0107889 A1 | 5/2010 | Denisart et al. | |
| 2010/0263546 A1* | 10/2010 | Leuzinger | A47J 31/3676 99/295 |
| 2011/0003038 A1* | 1/2011 | Colantonio | A47J 31/22 426/80 |

OTHER PUBLICATIONS

International Written Opinion for International Application No. PCT/EP2013/055499 dated Apr. 22, 2013.

* cited by examiner

BEVERAGE PREPARATION MACHINE WITH CLEANABLE BREWING HEAD

CROSS REFERENCE TO RELATED APPLICATIONS

The present application is a National Stage of International Application No. PCT/EP2013/055499, filed on Mar. 18, 2013, which claims priority to European Patent Application No. 12159788.4, filed Mar. 16, 2012, the entire contents of which are being incorporated herein by reference.

FIELD OF THE INVENTION

The present invention concerns a beverage preparation machine, having an improved brewing head that is easily cleanable.

BACKGROUND OF THE INVENTION

Beverage preparation machines that inject pressurized fluid into a capsule are well-known, especially in the field of producing coffee beverages, typically from roast and ground coffee. In addition, other substances such as chocolate, tea or milk products can be extracted or dissolved to form a beverage, from ingredients which are for instance soluble powders. The advantages of such a system are in particular the conservation and freshness of the ingredients, as well as the possibility of facilitating the operations of preparing the beverage.

The method of preparing the beverages using such a device is in principle as follows. The capsule is usually first inserted into a receiving brewing chamber of the beverage preparation device. After that, a water injection means, such as a needle connected to the liquid supply of the device and which projects inside the brewing chamber, is introduced through a face of the capsule to inject a hot or cold/ambient liquid, in order to make the liquid interact with the ingredients within the capsule. The liquid beverage resulting from this interaction is then discharged through a delivery face of the capsule. For example, the delivery face opens due to the internal pressure in the capsule generated by injecting the liquid, as described in applicant's European patent EP 1472156 B1.

It should be understood that the interaction between the liquid and the ingredients within the capsule can be e.g. dissolving, extraction, brewing or any other interaction in order to prepare a beverage by means of ingredients provided within the capsule.

In FIG. 1, a typical beverage preparation machine 1 is illustrated, which comprises a water reservoir 2, a brewing head 3, a cup tray 4 that can be set at different heights relative to the brewing head, control panel and buttons 5. In a possible embodiment, the control buttons comprise more particularly a rotating wheel 6 and the control panel is a screen 7. An ingredient capsule can be placed in a capsule holder 8 which is removably inserted into the brewing head 3. The screen 7 is suitable for displaying various information to the consumer, for instance the volume level 9 that is dispensed in the cup. The user can also choose the temperature of the beverage that will be prepared, by actuating hot or cold buttons 11 which are present close to the wheel and screen on the surface of the brewing head.

FIG. 2 represents schematically the internal configuration of an embodiment of a brewing head 3 in its open position. The capsule holder 8 is loaded with a capsule 12. The capsule has a top pierceable membrane 13, and top peripheral edge 14. The brewing head 3 typically comprises an open/close mechanism with a handle 15 and a knee mechanism 16 that mechanically links the handle to a support plate 17. The support plate 17 carries an injection plate 18 that is moved in direct contact with the peripheral edges 14 and top membrane 13 of the capsule in a leaktight manner, when the brewing head is in the closed position. The injection plate is preferably a needle plate that carries at least one injection needle 19 to pierce through the top membrane of the capsule when the brewing head is closed. The needle 19 is linked in a fluidic manner (via pipes) to the pump, heating element, and reservoir (elements not shown in the drawing) of the machine. Further details of a possible construction are disclosed in applicant's European patents EP 1967099 B1 or EP 1967100 B1.

Generally, machines for applying the principle of beverage production described above, use water for mixing with the beverage ingredients, hence scaling of the device or in particular within the needle plate can affect their functionality. Further, the needle plate is likely to be subjected to residua of dissolved or solid substance from the capsule, e.g. pierced or otherwise injected, such as coffee or the like, by a so-called "backflow" effect due to residual pressure within the capsule after the beverage was prepared and dispensed. More precisely, during backflow, small quantities of remaining beverage formed within the capsule and still under pressure therein even after most of the beverage has been released from said capsule, can flow back through the needle and leak in the surroundings of the needle plate.

Such residues and limescale are illustrated in FIG. 3, which shows the upper surface of the injection plate 18. As can be seen, limescale and residues "LSR" cover the needle plate upper surface, all around the needle upper rubber coupling 20 with the machine fluid pipes (not shown in FIG. 3).

As the needle for piercing the capsule has a small diameter, cleaning of said needle should be regularly carried out in order to ensure a correct functioning of the injection and particularly to prevent the needle from being blocked by scaling or by a substance provided within a capsule to be introduced, e.g., pierced or otherwise injected, by the needle. Moreover, it was observed that due to the backflow, the upper surface of the injection/needle plate tends to gather residues of beverage. And in addition to the ingredient residues that can accumulate on top of the injection/needle plate, it was found that due to the fact that the needle plate is made of metal, the temperature of the latter is low, and condensation tends to form from water vapour escaping the machine and the cup placed underneath, such that after some time, the upper surface of the needle plate is covered with limescale. Both residues and limescale are of course highly undesirable, and require regular cleaning, descaling, and maintenance of the needle plate, to ensure a proper, safe, and hygienic functioning of the machine.

For security reasons, the injection plate (i.e. the injection plate carrying the injection needle) was placed within a housing of the beverage preparation device itself, more precisely, as a part of the brewing head, so as to reduce the risk of getting in contact with the injection needle during the process of beverage preparation to a minimum extent, as described in EP 2071988 B1.

As described in EP'988, the needle plate was designed to be removed from the rest of the machine brewing head, to allow said needle plate and needle channel to be cleaned and descaled. However, this disassembling operation tends to be complex and, to some extent unsafe for the consumer, who still has to manipulate the needle plate with its protruding needle.

The objective of the present invention is to provide a beverage preparation machine having a brewing head and injection plate for injecting a liquid under pressure in a capsule that can be cleaned and descaled, without the need for a disassembling operation.

SUMMARY OF THE INVENTION

The objective of the present invention is met with a beverage preparation machine for preparing a beverage from a food substance contained in a capsule by injection of a liquid into said capsule, said machine comprising:
- a capsule holder for holding a capsule, said holder having a cup-shaped body, a handle portion, and a dispensing opening through the bottom portion of said body,
- a fluid conduction system comprising a fluid reservoir, a fluid pump, optionally a fluid heater, said reservoir, pump and heater being connected by fluid pipes,
- a brewing head having an aperture for receiving said capsule holder, and an injection support being connected to the fluid conduction system,
- an injection plate supported by said support, said plate comprising an upper surface with a fluid coupling connected to the fluid conduction system through said support, said plate further comprising a fluid conducting channel connecting the fluid coupling of said plate to a fluid injection element located in the lower surface of said plate, such that said injection element is able to inject fluid into a capsule placed in contact with said lower surface of said injection plate,
- characterized in that said injection plate further comprises at least one cleaning channel independent from the fluid conducting channel connecting its upper and lower surfaces, said cleaning channel being suitable for circulating fluid at least from the lower surface towards the upper surface of the injection plate.

Advantageously, the machine further can comprise a closing mechanism operable between an open position wherein the capsule holder can be inserted or removed from the brewing head, and a closed position wherein said capsule holder and said injection plate are moved towards each other such that said injected plate can inject fluid into the capsule.

The injection plate of the machine is releasably mounted on a support at the injection side of said brewing head by means of a releasable connection mechanism, wherein the releasable connection mechanism comprises a latch mechanism for removably locking the injection plate to the support.

Preferably, the injection of a fluid (or liquid) into the capsule is performed under pressure.

In a highly preferred embodiment of the invention, the injection element is a needle which projects into the brewing head, such that it is able to pierce through a wall of the capsule inserted in the latter.

Alternatively though, the injection element can take the form of a series of injection holes forming a liquid shower at the injection side of the injection plate. In this case, the series of injection holes can be connected to a common liquid inlet at the support plate via a common manifold.

In a preferred embodiment of the invention, the upper surface of the injection plate comprises a substantially concave portion, wherein the lowermost level point of said concave portion coincides with a cleaning channel. Such a configuration allows the cleaning fluid passing through the cleaning channel(s) from below the injection plate, to wet the upper surface of the latter, without flowing out to the outer edges of the plate. Of course a small quantity of fluid can be withheld, which is sufficient though, to descale and clean the liquid or soft residues from the plate. If necessary, several wetting/drainage cycles can be performed, wherein cleaning fluid (either hot water or hot descaling liquid for instance) is alternatively:
- injected from the machine fluid system through the injection plate into the capsule holder or capsule, such that said cleaning fluid fills said capsule holder or capsule and overflows through the cleaning channels, upwardly to the upper surface of the injection plate (i.e. wetting step), and then
- flows back downwards by gravity when injection of the fluid is stopped (i.e. drainage step).

In a highly preferred embodiment of the invention, the capsule holder comprises a dispensing opening having a diameter comprised between 1 and 10 mm, preferably between 3 and 7 mm. Such an output diameter is essential to guarantee that the fluid injected into the capsule holder during a cleaning cycle, does not flow out too rapidly: the dispensing opening diameter must be sufficiently large to let fluid out by gravity, but at the same time, it must also be sufficient small to ensure that fluid injected in the capsule holder fills the latter, such that the injected fluid will overflow through the cleaning channel(s) of the injection plate and wet the upper surface of said plate. The diameter is calculated depending on the flow output of the machine pump, and the diameter and number of cleaning channels pierced through the injection plate. The capsule holder that is used for cleaning can be of a different type than that normally used for beverage preparation. In that case, the consumer is provided with a regular capsule holder for beverage preparation (having for instance a larger dispensing opening), as well as a capsule holder having a dispensing opening diameter within the range mentioned above, which is used more specifically as a "cleaning tool".

As a further alternative, the regular capsule holder that is normally used for beverage preparation can be used also for cleaning. In that case, if the diameter of the dispensing opening of that capsule holder is considered too large, a "fake capsule" can be provided, which is an "empty shell" comprising side walls, a bottom wall, an upper opening, and a dispensing opening located at the bottom and/or side wall(s), and said dispensing opening having a diameter comprised between 1 and 10 mm, preferably between 3 and 7 mm. The reasons for such a diameter are the same as previously explained in reference to a cleaning version of the capsule holder.

The present invention is further directed to a process for cleaning the injection plate of a beverage preparation machine as described above, which comprises the steps of, in order:
   (i) inserting a capsule holder in the brewing head of said machine, said holder having a dispensing opening with a diameter comprised between 1 and 10 mm, preferably between 3 and 7 mm, or alternatively inserting a capsule in a capsule holder, said capsule having side walls, a bottom wall, an upper opening, and a dispensing opening located through the bottom and/or side walls, said dispensing opening having a diameter comprised between 1 and 10 mm, preferably between 3 and 7 mm, (ii) injecting fluid from the machine reservoir through the fluid system into said capsule holder, respectively said capsule, until said fluid fills said holder or capsule, overflows upwardly through said at least one cleaning channel of the injection plate, and contacts the upper surface of said injection plate, (iii) stopping the fluid injection, so as to let said injected fluid to flow by gravity from the upper surface of the injection plate, through said at least one cleaning channel, into the holder, respectively the capsule, through the dispensing opening of said holder or capsule into a receptacle located hereunder, (iv) optionally repeating steps (ii) and (iii) a predetermined number of times.

Advantageously, the injected fluid is hot water, or a hot descaling solution.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
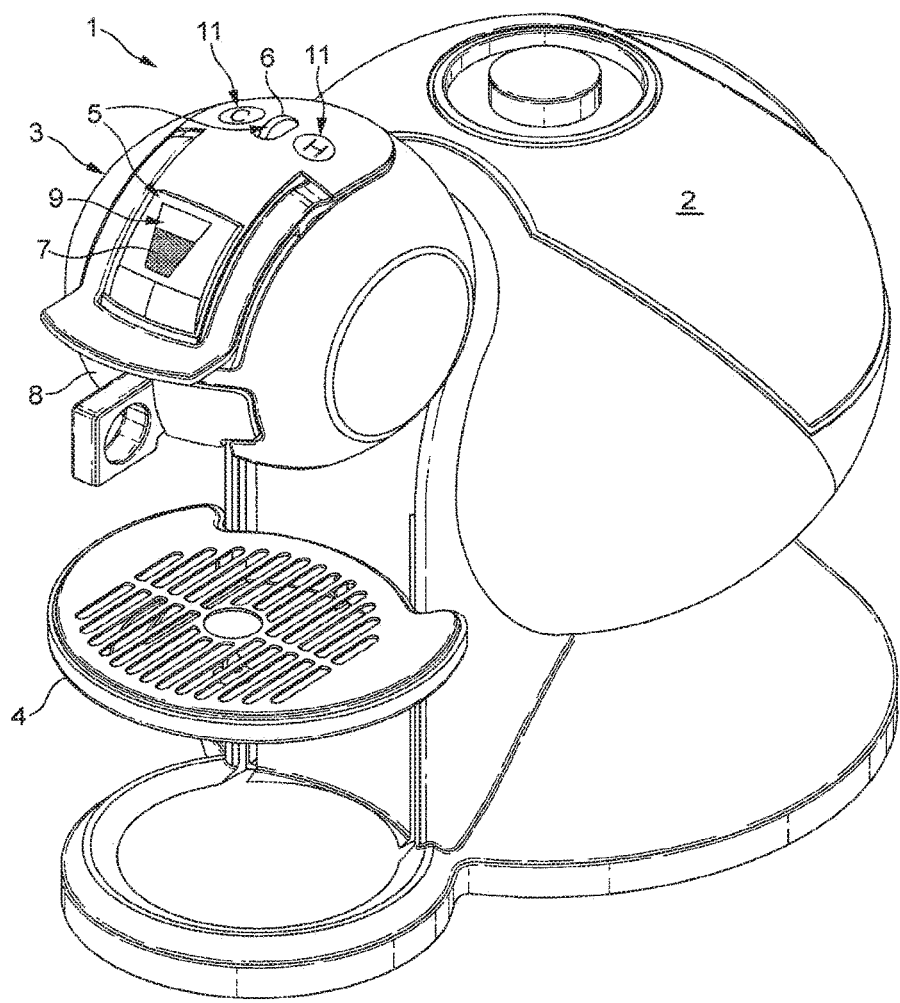
FIG. 1 is a schematic perspective view of a beverage preparation machine according to the invention.

The present invention concerns a machine of the type illustrated in FIG. 1. Such a machine comprises a water reservoir 2, a brewing head 3, a cup tray 4 that can be set at different heights relative to the brewing head, control panel and buttons 5. In a possible embodiment, the control buttons comprise more particularly a rotating wheel 6 and the control panel is a screen 7. An ingredient capsule can be placed in a capsule holder 8 which is removably inserted into the brewing head 3. The screen 7 is suitable for displaying various information to the consumer, for instance the volume level 9 that is dispensed in the cup. The user can also choose the temperature of the beverage that will be prepared, by actuating hot or cold buttons 11 which are present close to the wheel and screen on the surface of the brewing head.

Figure 2:
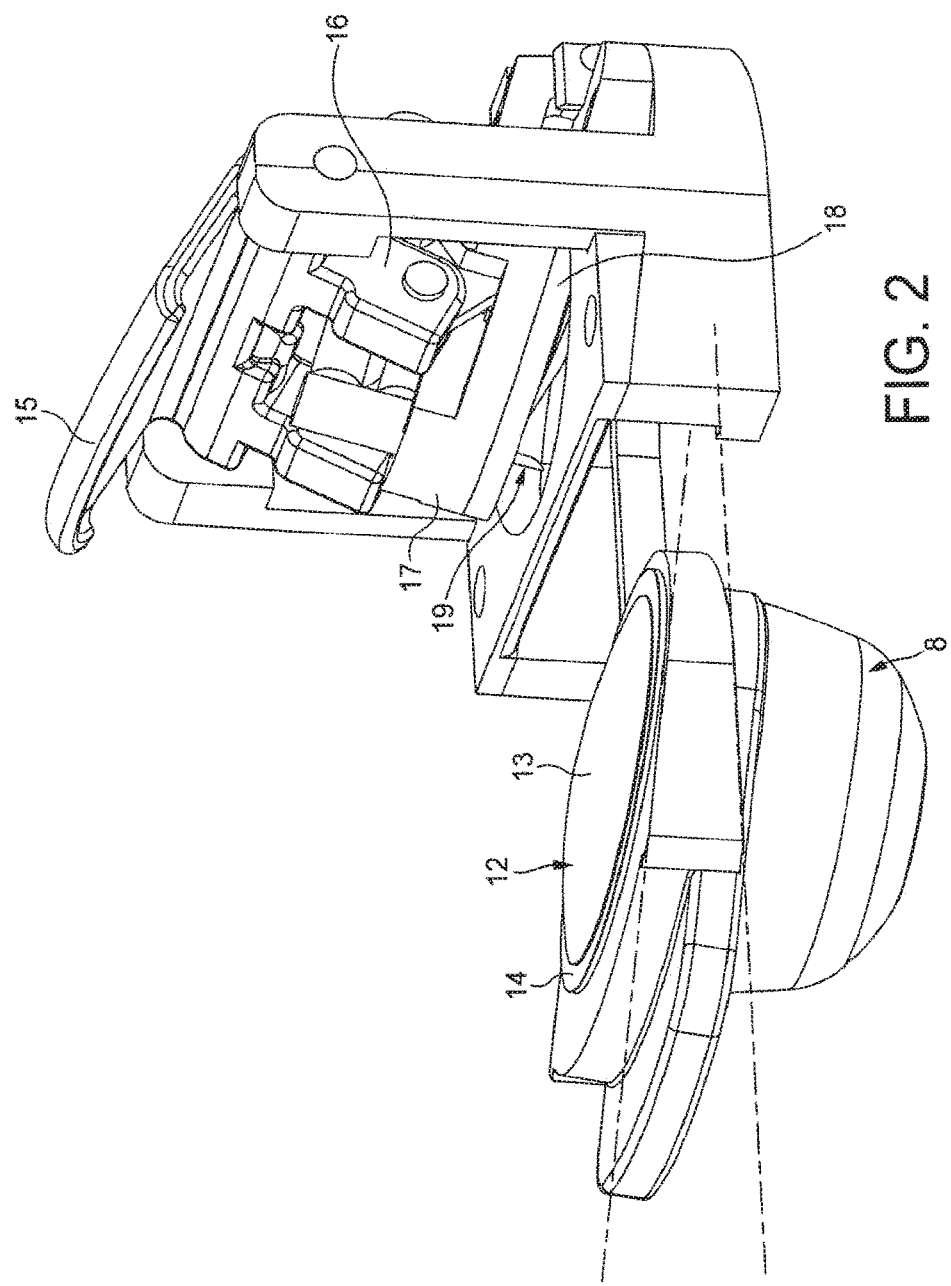
FIG. 2 is a schematic enlarged perspective view showing the interior of the brewing head of a machine as illustrated in FIG. 1.
Figure 3:
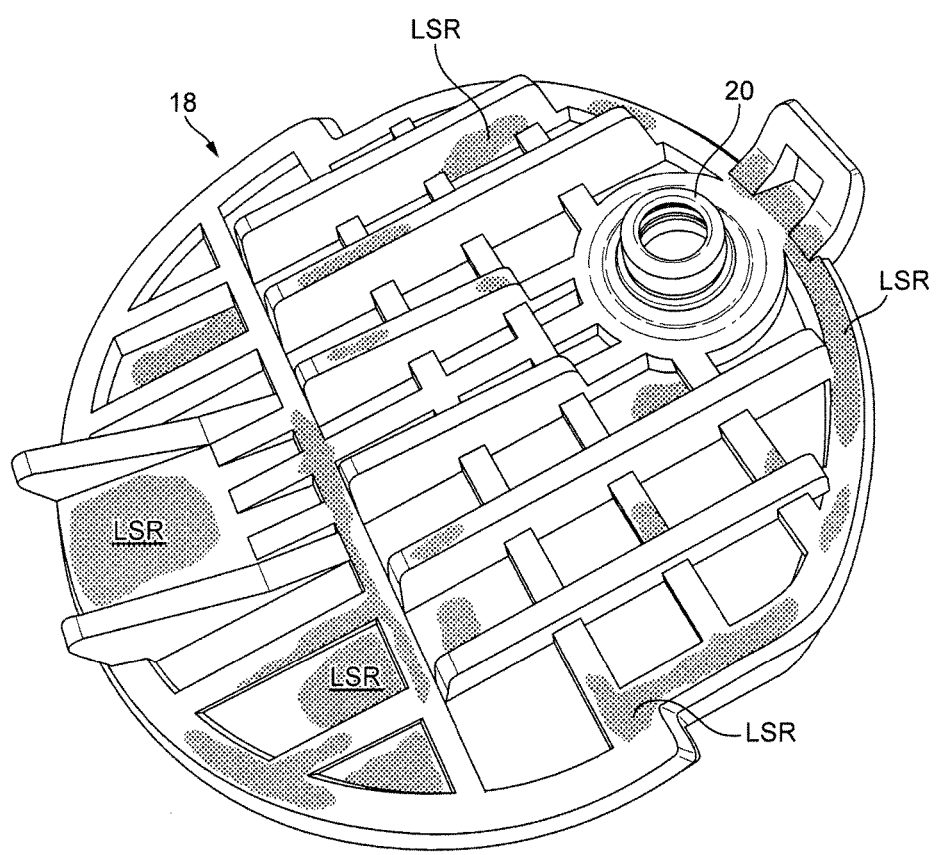
FIG. 3 is a top view of a needle plate in a beverage machine according to the invention, covered with residues and limescale.

FIG. 2 represents schematically the internal configuration of an embodiment of a brewing head 3 in its open position. The capsule holder 8 is loaded with a capsule 12. The capsule has a top pierceable membrane 13, and top peripheral edge 14. The brewing head 3 typically comprises an open/close mechanism with a handle 15 and a knee mechanism 16 that mechanically links the handle to a support plate 17. The support plate 17 carries an injection plate 18 that is moved in direct contact with the peripheral edges 14 and top membrane 13 of the capsule in a leaktight manner, when the brewing head is in the closed position. The injection plate is a needle plate 18 that carries one injection needle 19 to pierce through the top membrane of the capsule when the brewing head is closed. The needle 19 is linked in a fluidic manner (via pipes) to the pump, heating element, and reservoir (elements not shown in the drawing) of the machine.

The fluid conducting channel is unable to conduct fluid (e.g. water) directly to the upper surface of the needle plate.

Figure 4:
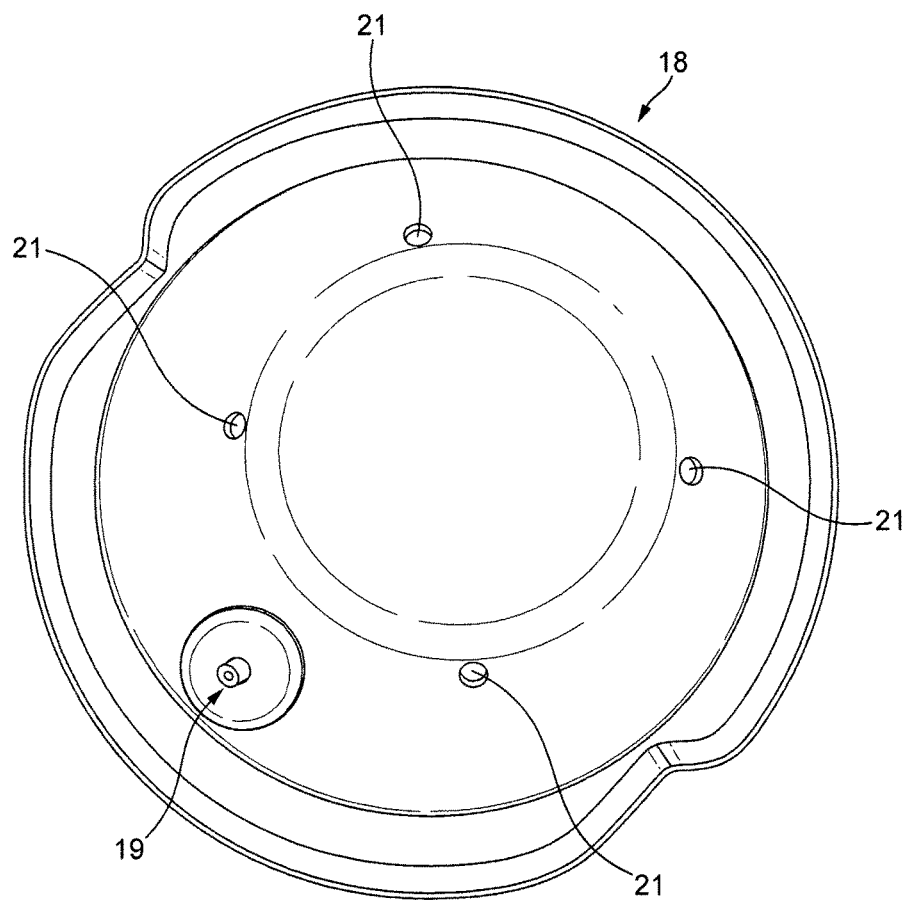
FIG. 4 is a bottom view of a needle plate for a beverage preparation machine, according to the invention.

According to the invention, and as illustrated in FIG. 4, the needle plate 18 comprises several cleaning channels 21. These channels 21 are through holes which connect the lower surface 22 of the needle plate to its upper surface 23. These channels are completely independent from the fluid conveying channel 24 that conveys water from the fluid system of the machine to the needle. Channel 24 does not communicate with the upper portion 23 of the needle plate. The diameter of the cleaning channels 21 is comprised between 0.4 and 7.0 mm, and more precisely, the diameter is about 1.5 mm.

Figure 5:
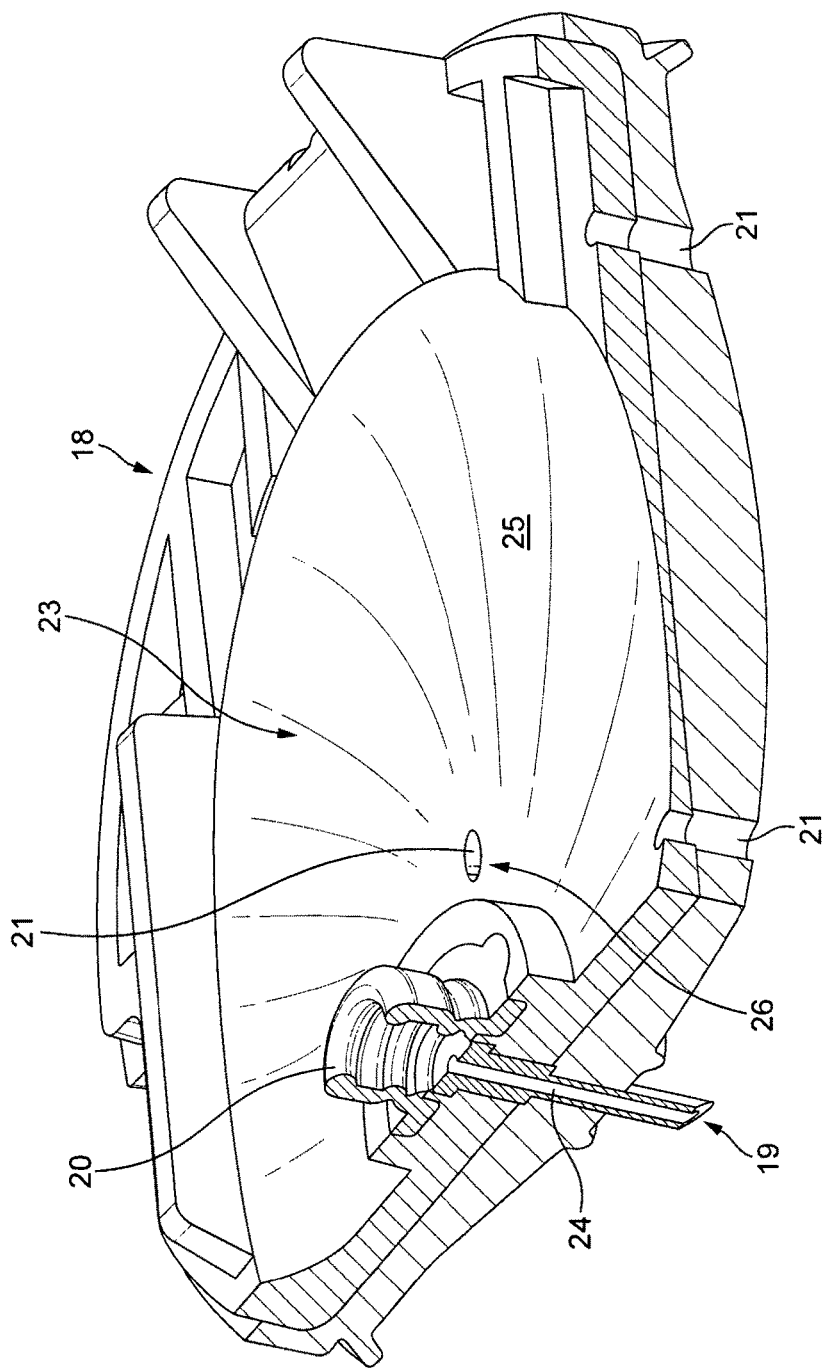
FIG. 5 is a schematic top perspective cut view of the needle plate illustrated in FIG. 4.

In FIG. 5, the needle plate 18 is illustrated in a perspective view, partially cut so as to show how the cleaning channels 21 are built. FIG. 5 illustrates a preferred embodiment of the invention wherein the needle plate 18 comprises a concave portion 25 across its upper surface. The lowermost point 26 of the concave portion 25, coincides with one of the cleaning channels 21. As a result, when a cleaning cycle of the machine is performed as will be explained later, the hot water or hot descaling fluid which wets the upper surface of the needle plate 18 can be drained by gravity through the corresponding cleaning channel such that substantially no liquid remains onto the upper surface 23.

Figure 6:
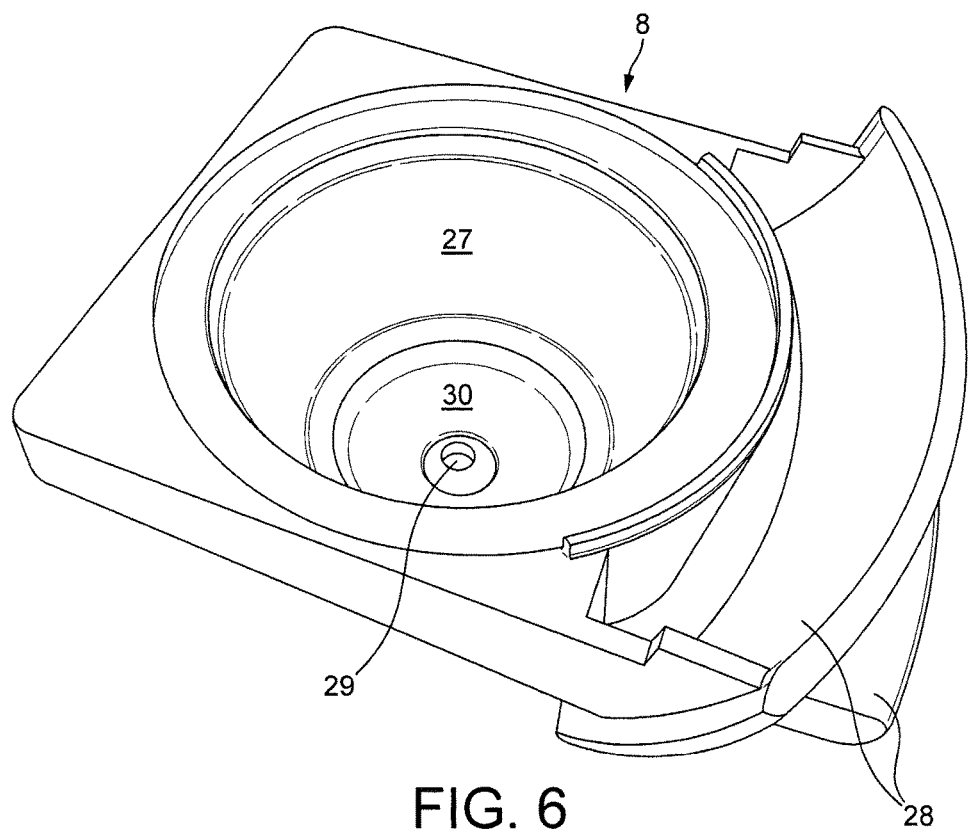
FIG. 6 is top perspective view of a capsule holder adapted for cleaning according to the invention.

In order to be able to preform a cleaning cycle, the machine is preferably used with a capsule holder 8 as illustrated in FIG. 6. The capsule holder 8 comprises a cup-shaped body 27, a handle portion 28, and a dispensing opening 29 through the bottom portion 30 of said body 27.

Figure 7:
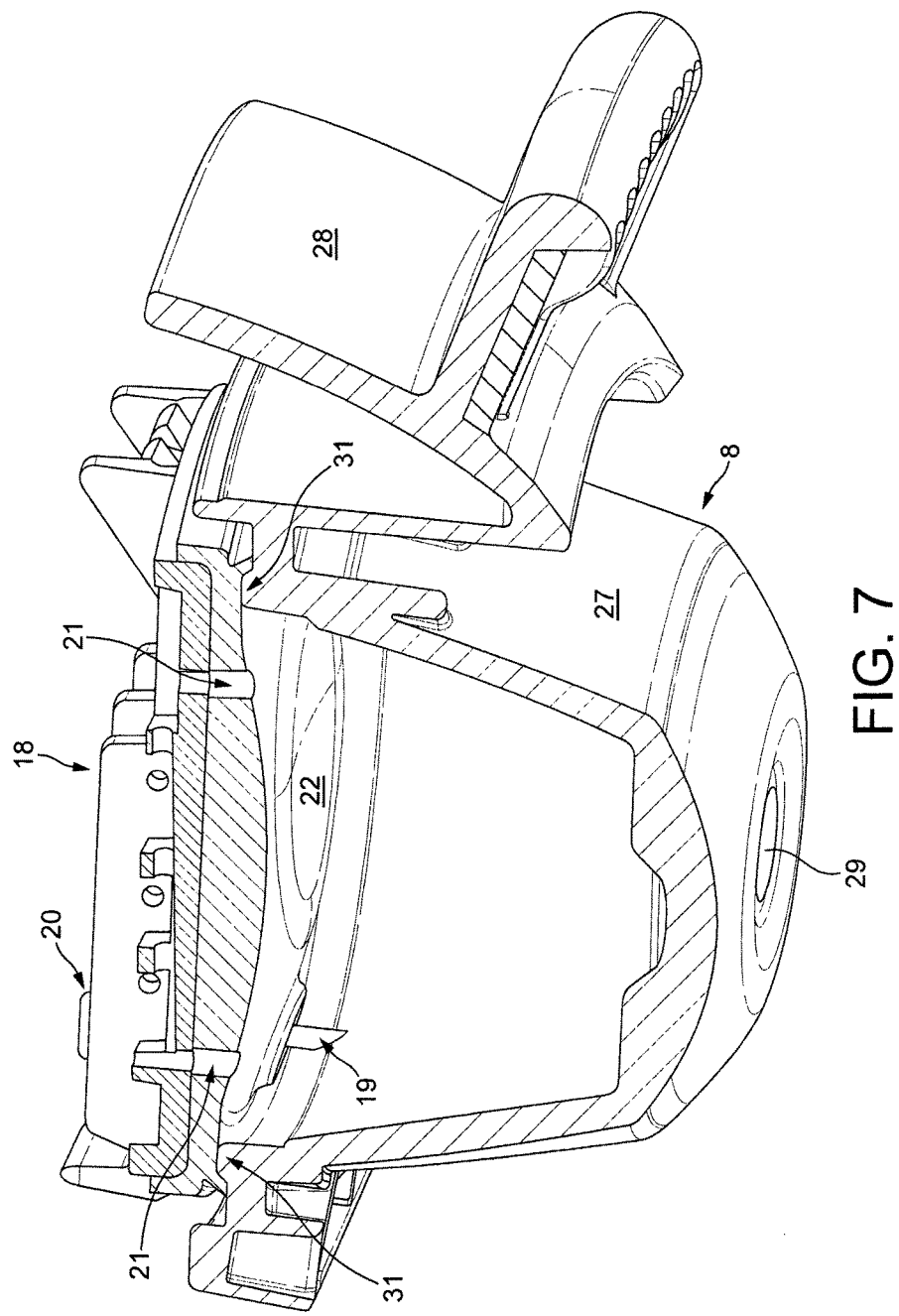
FIG. 7 is a schematic perspective enlarged cut view of a capsule holder for cleaning according to the invention, that is inserted in the brewing head of a beverage preparation machine, with the needle plate of the invention adapted thereonto.
Figure 8:
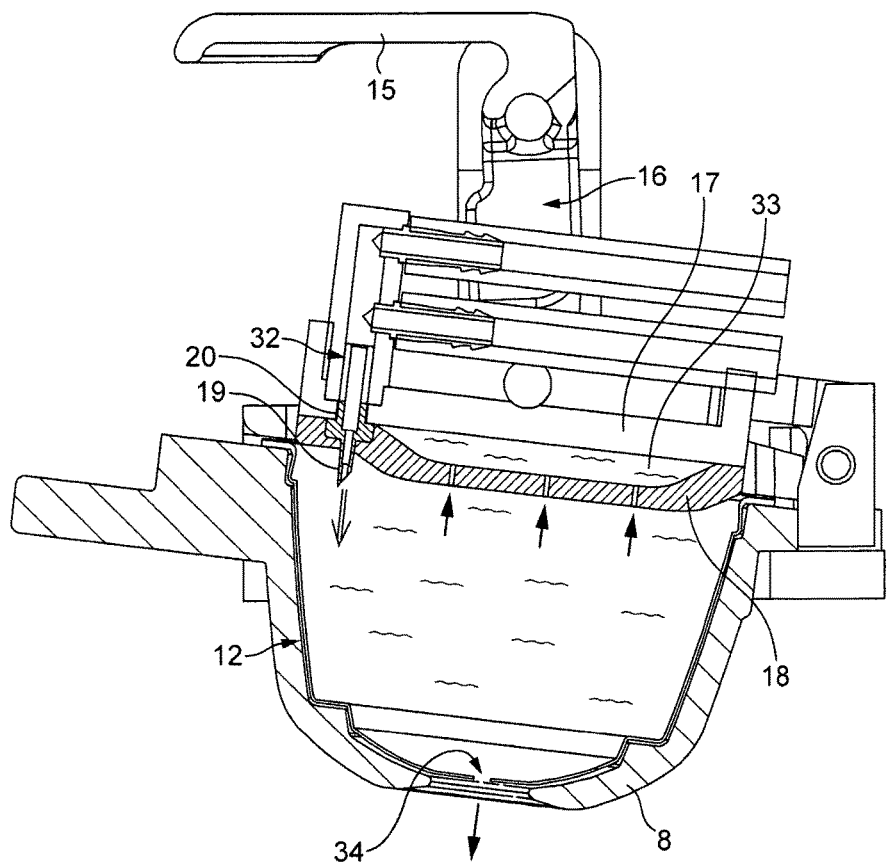
FIG. 8 is a schematic profile cut view of a brewing head in the closed position, showing the circulation of liquid during a cleaning cycle according to the invention.

As illustrated in FIG. 7, when the beverage preparation machine 1 is in its proper functional configuration, with the capsule holder 8 inserted in the brewing head 3, and the brewing head is closed, the lower surface 22 of the needle plate 18 rests onto the upper edges 31 of said capsule holder 8 in a leaktight manner. Preferably, the lower surface 22 of said needle plate 18 is made of a flexible material such as soft rubber, so as to increase the leaktightness. In that configuration of the machine, the needle 19 is connected in a leaktight manner to the rest of the machine fluid system, via the needle upper coupling 20 which is connected to a corresponding coupling 32 of the fluid system as shown in FIG. 8. An empty space 33 remains between the upper surface 23 of the needle plate and the lower surface of the support plate 17 of the machine, as illustrated in FIG. 8. This empty space cannot be avoided due to the construction of the machine and because the needle plate 18 needs to be detachable from the support plate 17 in case said needle plate 18 has to be replaced for any reason (blocked needle for instance). As explained above, the empty space 33 is subject to condensation of hot water after many beverage preparation cycles, such that the upper surface 23 of the needle plate 18 is covered with limescale, especially if the water used by the consumer is hard water. Moreover, sometimes resurgence of beverage product can occur due to the fact that the beverage preparation is performed under fluid pressure, so that small quantities of the prepared beverage can reach the upper surface of the said needle plate.

As a general principle of the invention, for the cleaning of the upper surface 23 of the needle plate 18 to be performed in appropriate conditions, it is important that the fluid injected within the capsule holder, or within the capsule 12 loaded in said holder, flows sufficiently slowly out of the dispensing opening of said holder, respectively out of the dispensing opening of said capsule 12. More precisely, the flowrate of dispensed fluid must be less than the flowrate of the fluid injected through the needle 19 from the fluid system of the machine. Given that this condition is fulfilled, during a cleaning cycle, the fluid injected through the needle, for instance hot water, or hot descaling liquid, will fill the interior of the capsule holder, respectively the interior of the capsule held in said holder. At some point, the fluid will reach the lower surface 22 of the needle plate, and then will pass through the cleaning channels 21 as illustrated in FIG. 8.

To that effect, one alternative solution illustrated for instance in FIGS. 6 and 7, is to ensure that the dispensing opening 29 of the capsule holder has a diameter comprised between 1 and 10 mm, preferably between 3 and 7 mm Another alternative solution shown in FIG. 8 is to place in the holder a capsule 12 having a diameter for its dispensing opening 34 comprised between 1 and 10 mm, preferably between 3 and 7 mm. In that case, the upper peripheral edges 35 of the capsule 12 are pinched between the capsule holder upper edges 31, and the needle plate 18, when the brewing head 3 of the machine 1 is in its closed, functional configuration as shown in FIG. 8.

The present invention further relates to a process of cleaning the machine 1, in particular the upper surface of the needle plate 18 of a machine as described above.

FIG. 8 represents how the cleaning of the upper surface 23 of the needle plate is performed. After inserting a capsule holder having a dispensing opening with a diameter comprised between 1 and 10 mm, preferably between 3 and 7 mm, or alternatively after inserting a capsule in a capsule holder, said capsule having side walls, a bottom wall, an upper opening, and a dispensing opening located through the bottom and/or side walls, said dispensing opening having a diameter comprised between 1 and 10 mm, preferably between 3 and 7 mm, the user closes the brewing head 3 of the machine 1, in a functional configuration represented in the FIG. 8.

The user then starts the machine to actuate injection of fluid from the machine reservoir through the needle—as shown by a double arrow—into said capsule holder, respectively said capsule, until said fluid fills said holder or capsule and overflows upwardly through the cleaning channels 21 of the injection plate 18—see small arrows in front of the cleaning channels—. At this point in time, the cleaning fluid (hot water or hot descaling fluid for instance) fills at least part of the empty space 33 located between the needle plate 18 and the support plate 17. Said fluid therefore wets the upper surface of said injection plate as shown in FIG. 8. Any residues or limescale covering said plate 18 are dissolved in the cleaning fluid.

Then, the fluid injection stops. This stop can be performed manually by the user after a few seconds by actuating a push button or over command on the control panel of the machine, or alternatively, the fluid injection can be stopped automatically by the machine, after a predetermined time of injection, which is programmed in a control board of the machine. When the fluid injection stops, the cleaning fluid starts flowing by gravity from the empty space 33 and upper surface 23 of the injection plate, through the cleaning channels 21 into the holder, respectively the capsule, then through the dispensing opening of said holder or capsule, into a receptacle located hereunder (not represented in the drawing).

The user can then repeat the injection and drainage steps several times to ensure that all residues and limescale is removed.

In line with the invention principles described above, another advantageous embodiment of the needle plate can also be envisaged, which will now be described in reference to FIGS. 9 to 12.

Figure 9:
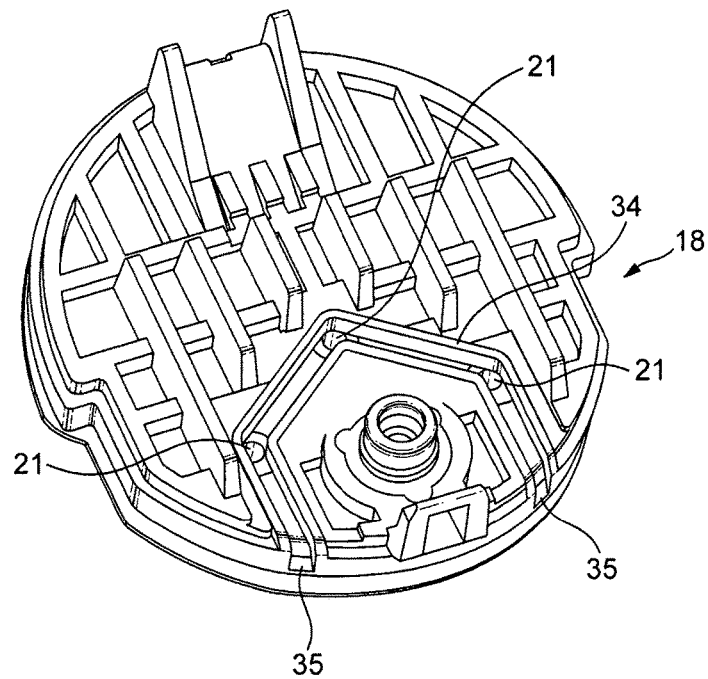
FIG. 9 is schematic perspective view showing the upper surface of one embodiment of the needle plate with overflow conducting channels.

As illustrated in FIG. 9, the upper surface of the injection (needle) plate 18 can comprise overflow directing channel 34. This channel serves to direct the flow of fluid circulating at the surface of the needle plate 18. As shown in the drawing, said channel 34 is substantially U-shaped and the upper aperture of all the cleaning channels 21 is in fluid communication with said overflow directing channel 34. If fluid under pressure flows from below the needle plate, upwards through the cleaning channels 21, said fluid is then directed through the directing channel 34 towards the front openings 35 of said channel 34. These openings 35 are directed towards the front of the machine 1, such that any fluid exiting through said openings 35 would inevitably drip or flow in the cup tray 4, and not in the back of the machine head towards the inside of the machine casing where the functional components of said machine are located. Such a construction and direction of the fluid flow therefore improves the cleanliness and safety of the machine in case of a fluid flowing onto the needle plate 18. The depth of the overflow directing channel 34 is comprised between 0.1 and 5 mm, preferably between 0.3 and 2 mm. Said channel 34 has a width comprised between 0.5 and 7 mm, preferably between 1 and 3 mm.

Figure 10A:
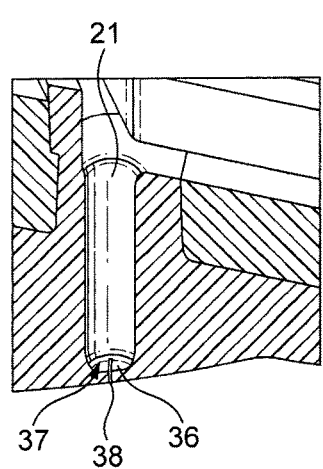
FIGS. 10A and 10B are enlarged side, respectively top views of an embodiment of cleaning channels with anti-backflow rubber valves.
Figure 10B:
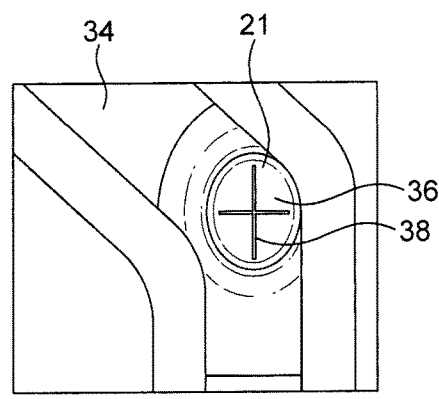

In another aspect of the invention, as illustrated in FIGS. 10A and 10B, the cleaning channels 21 comprise one-way, pressure-sensitive valves 36 that close the lower opening 37 of each cleaning channel 21. The valves 36 let fluid flow through from below the needle plate, upwardly, and only when a certain fluid pressure is achieved. The valves 36 serve to ensure that only cleaning fluid which is present under the needle plate under pressure can flow upwards to the upper side of said needle plate, along with the principles of the invention described above. On the contrary, in case the fluid pressure under the needle plate is not sufficient, the valves do not open and the fluid stays below the needle plate. This is typically the case when the beverage machine is used for preparing a beverage, and when some of the product flows back from the capsule compartment upwardly through the injection hole pierced in the top membrane of said capsule, as explained above in the background part of the present specification. In such a case, product residues that flow back between the upper surface of the capsule and the lower surface of the needle plate cannot soil the upper surface of the needle plate. As shown in FIG. 10B, each valve is preferably made by a rubber web that is integrally moulded with the rubber layer that covers the lower surface of the needle plate, said rubber web further comprising cross-cut 38 to form the valve lips.

Figure 11:
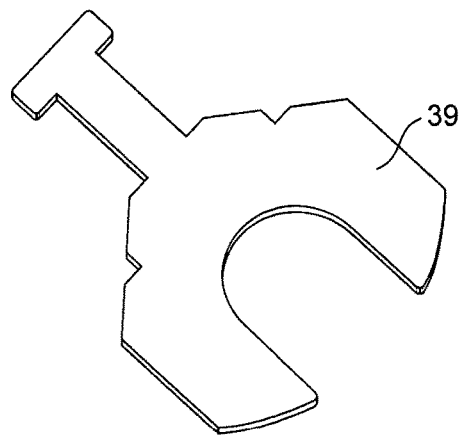
FIG. 11 is a schematic view of a cover sheet for the needle plate of the invention.
Figure 12:
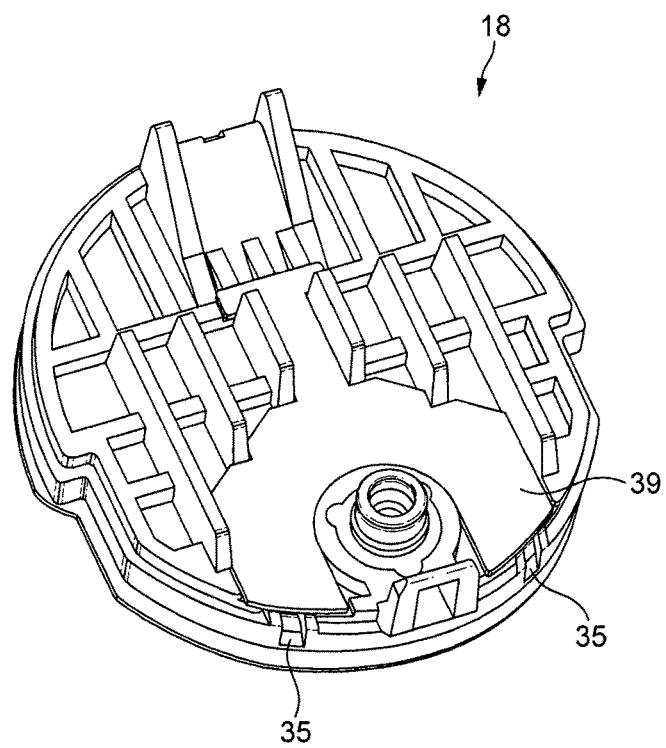
FIG. 12 is a schematic view of a needle plate with cover sheet and overflow guiding channels according to the invention.

In yet another aspect of the invention illustrated in FIGS. 11 and 12, the needle plate 21 can further comprise a cover element 39 that closes the overflow conducting channel 34 to even further improve the conduction of the flow throughout and towards the channel openings 35.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage preparation machine for preparing a beverage from a food substance contained in a capsule by injection of a fluid into the capsule, the beverage preparation machine comprising:
   a capsule holder for holding the capsule, the capsule holder having a cup-shaped body, a handle portion, and a dispensing opening through a bottom portion of the cup-shaped body;
   a fluid conduction system comprising a fluid reservoir and a fluid pump, the fluid reservoir, the fluid pump and a heater being connected by fluid pipes;
   a brewing head having an aperture configured to receive the capsule holder, and an injection support connected to the fluid conduction system; and
   an injection plate supported by the injection support, the injection plate comprising an upper surface with a fluid coupling connected to the fluid conduction system through the injection support, the injection plate further comprising a fluid conducting channel connecting the fluid coupling to a fluid injection element located in a lower surface of the injection plate, such that the fluid injection element is able to inject the fluid into the capsule,
   the injection plate further comprises at least one cleaning channel independent from the fluid conducting channel connecting the upper surface and the lower surface of the injection plate, the at least one cleaning channel configured to circulate the fluid at least from the lower surface towards the upper surface of the injection plate,
   the upper surface of the injection plate comprises an overflow directing channel fluidly connecting an upper aperture of the at least one cleaning channel to an opening of the overflow directing channel that is positioned to direct the fluid exiting through the opening of the overflow directing channel toward a cup tray.

2. The beverage preparation machine according to claim 1, comprising a closing member operable between an open position wherein the capsule holder can be inserted or removed from the brewing head, and a closed position wherein the capsule holder and the injection plate are moved towards each other such that the injection plate can inject the fluid into the capsule.

3. The beverage preparation machine according to claim 1, wherein the injection plate is releasably mounted on the injection support at an injection side of the brewing head by a releasable connection member, wherein the releasable connection member comprises a latch member configured to removably lock the injection plate to the injection support.

4. The beverage preparation machine according to claim 1, wherein the injection of the fluid into the capsule is performed under pressure.

5. The beverage preparation machine according to claim 1, wherein the fluid injection element is a needle which projects into the brewing head, such that the fluid injection element is able to pierce through a wall of the capsule inserted in the brewing head.

6. The beverage preparation machine according to claim 1, wherein the fluid injection element is a series of injection holes forming a liquid shower at an injection side of the injection plate.

7. The beverage preparation machine according to claim 6, wherein the series of injection holes are connected to a common fluid inlet at the injection support by a common manifold.

8. The beverage preparation machine according to claim 1, wherein the upper surface of the injection plate comprises a substantially concave portion, wherein a lowermost level point of the substantially concave portion coincides with one of the at least one cleaning channel of the injection plate.

9. The beverage preparation machine according to claim 1, wherein the capsule holder comprises a dispensing opening having a diameter ranging between 1 and 10 mm.

10. A process for cleaning an injection plate of a beverage preparation machine, the process comprising the steps of, in order:
    (i) inserting a capsule holder in a brewing head of the beverage preparation machine, the capsule holder having a dispensing opening with a diameter of between 1 and 10 mm, or alternatively inserting a capsule in the capsule holder, the capsule having side walls, a bottom wall, an upper opening, and a dispensing opening located through a bottom and/or the side walls, the dispensing opening having a diameter of between 1 and 10 mm;
    (ii) injecting fluid from a reservoir of the beverage preparation machine through a fluid system into the capsule holder, or the capsule, until the fluid fills the capsule holder or capsule, overflows upwardly through a cleaning channel of an injection plate, and contacts an upper surface of the injection plate; and
    (iii) stopping the fluid injection to let the injected fluid to flow by gravity from an upper surface of the injection plate, through the cleaning channel, into the capsule holder, or the capsule, through the dispensing opening of the capsule holder or the capsule into a receptacle located hereunder.

11. The process according to claim 10, wherein the fluid is hot water, or a hot descaling solution.

12. The process according to claim 10, comprising repeating steps (ii) and (iii) a predetermined number of times.

13. A beverage preparation machine for preparing a beverage from a food substance contained in a capsule by injection of a fluid into the capsule, the beverage preparation machine comprising:
    a capsule holder for holding the capsule, the capsule holder having a cup-shaped body, a handle portion, and a dispensing opening through a bottom portion of the cup-shaped body;
    a fluid conduction system comprising a fluid reservoir and a fluid pump, the fluid reservoir, the fluid pump and a heater being connected by fluid pipes;

a brewing head having an aperture configured to receive the capsule holder, and an injection support connected to the fluid conduction system; and an injection plate supported by the injection support, the injection plate comprising an upper surface with a fluid coupling connected to the fluid conduction system through the injection support, the injection plate further comprising a fluid conducting channel connecting the fluid coupling to a fluid injection element located in a lower surface of the injection plate, such that the fluid injection element is able to inject the fluid into the capsule, the injection plate further comprises at least one cleaning channel independent from the fluid conducting channel connecting the upper surface and the lower surface of the injection plate, the at least one cleaning channel configured to circulate the fluid at least from the lower surface towards the upper surface of the injection plate, the beverage preparation machine further comprising a control board configured for the beverage preparation machine to inject the fluid from the reservoir of the beverage preparation machine through the fluid system into the capsule holder or the capsule until the fluid fills the capsule holder or the capsule, overflows upwardly through the at least one cleaning channel of the injection plate, and contacts the upper surface of the injection plate; and to stop the fluid injection to let the injected fluid to flow by gravity from the upper surface of the injection plate through the at least one cleaning channel.

* * * * *